United States Patent
Kietzer (12)

(10) Patent No.: US 6,237,480 B1
(45) Date of Patent: May 29, 2001

(54) APPARATUS FOR THE DUSTFREE DISCHARGE OF FINE DUST FROM A DUST COLLECTOR

(75) Inventor: Klaus Kietzer, Berlin (DE)

(73) Assignee: HET HALLER Entwicklungs- und Technologiegesellschaft mbH & Co, Berlin (DE)

( * ) Notice: Subject to any disclaimer, the term of this patent is extended or adjusted under 35 U.S.C. 154(b) by 659 days.

(21) Appl. No.: 08/508,738

(22) Filed: Jul. 28, 1995

(30) Foreign Application Priority Data

Jul. 28, 1994 (DE) .................................. 44 26 849

(51) Int. Cl.⁷ .......................... B30B 15/32; B30B 11/02
(52) U.S. Cl. .......................... 100/45; 15/340.1; 100/90; 100/100; 100/192; 100/215; 100/250
(58) Field of Search ................. 100/90, 45, 102, 100/103, 189, 191, 192, 215, 249, 250, 906, 909, 100; 15/340.1; 55/430, 432

(56) References Cited

U.S. PATENT DOCUMENTS

| 2,168,889 | * | 8/1939 | Thomas ............................... 100/192 |
| 3,527,160 | * | 9/1970 | Vollmer ............................... 100/250 |
| 3,638,561 | * | 2/1972 | Price et al. ............................ 100/45 |
| 3,980,014 | * | 9/1976 | McEwen et al. ..................... 100/906 |
| 4,099,457 | * | 7/1978 | Hyden .................................. 100/249 |
| 4,925,467 | * | 5/1990 | Jordon et al. .......................... 55/430 |
| 5,013,343 | * | 5/1991 | Miyamoto .............................. 55/430 |
| 5,317,783 | * | 6/1994 | Williamson ........................ 15/340.1 |
| 5,428,864 | * | 7/1995 | Pemberton ............................. 55/430 |
| 5,697,293 | * | 12/1997 | Mogenier ............................... 55/430 |
| 5,768,744 | * | 6/1998 | Hamilton ........................... 15/340.1 |

FOREIGN PATENT DOCUMENTS

| 494211 | | 3/1930 | (DE) . |
| 2330039 | * | 1/1974 | (DE) .................................. 100/250 |
| 2419960 | * | 11/1975 | (DE) .................................. 100/249 |
| 62-259700 | * | 11/1987 | (JP) .................................... 100/102 |

* cited by examiner

Primary Examiner—Stephen F. Gerrity
(74) Attorney, Agent, or Firm—Alston & Bird LLP

(57) ABSTRACT

Apparatus for the dustfree discharge of fine dust from a dust collector which includes a compression chamber having a discharge end, a conveyor for feeding fine dust from a collector into the compression chamber, a compressing piston in the compression chamber for compressing the fine dust toward the discharge end and a counterpressure device moveable in the direction of compression for applying a controlled counterpressure to the fine dust being compressed.

2 Claims, 2 Drawing Sheets

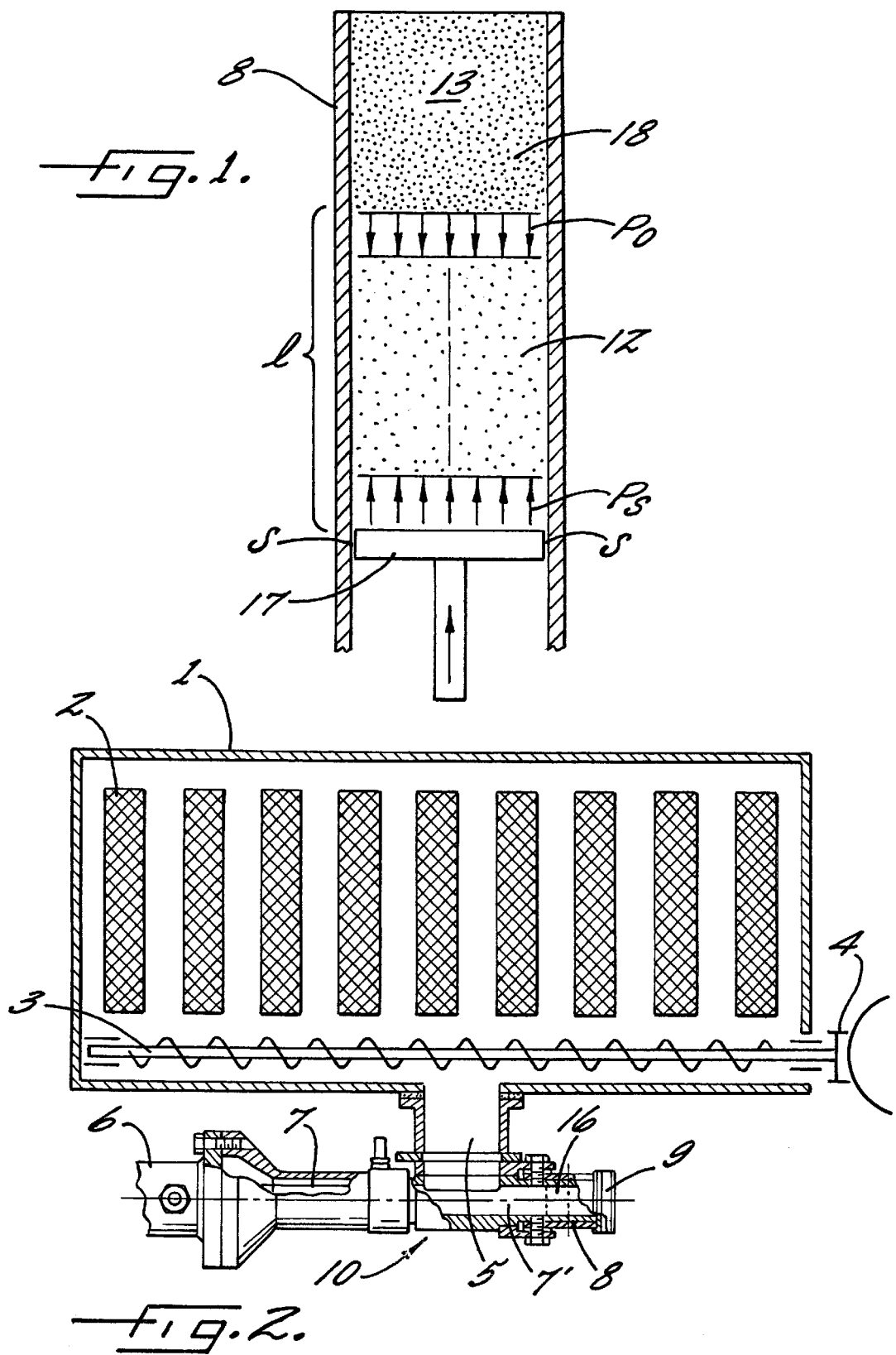

APPARATUS FOR THE DUSTFREE DISCHARGE OF FINE DUST FROM A DUST COLLECTOR

FIELD OF THE INVENTION

The present invention relates to a method for the dustfree discharge of fine dusts from a dust collector of a cleaning vehicle, in particular a dry sweeping machine, in which the fine dusts collected in the dust collector are removed therefrom by means of a conveyor device, subsequently compacted under the action of mechanical compression, and discharged in the form of compacted cylindrical chunks or pellets. The invention further relates to an apparatus for carrying out the method.

BACKGROUND OF THE INVENTION

Such methods and likewise the associated apparatus for carrying out the method are known in particular from dry sweeping machines, in which the sweepings, and in particular the portion of fine dusts in the sweepings are not absorbed by water during the sweeping. Instead, the fine dust is separated in the dust collector on filter elements, after the coarse sweepings have previously settled, under the action of gravity and with the cooperation of an impingement hood, in the receptacle for coarse sweepings.

The problem underlying the present invention consists in that the fine dusts accumulated in the dust collector of a dry sweeping machine are liable to penetrate the lungs due their particle size and, possibly, contain health damaging substances, and that they cannot be easily added in untreated form to the receptacle for coarse sweepings. Moreover, because of the suction air current within the receptacle for coarse sweepings, it is problematic to return the fine dusts in the form of dust to the receptacle for coarse sweepings. This would lead to an endless maintenance or concentration of the dust circulation.

The present invention is based on the further development of the method described in DE 4 94 211 and the apparatus disclosed therein for a gastight discharge of the dust separated in the collection chamber of gas-cleaning installations by its removal therefrom. The further development of this known method from the year 1930 has become necessary due to the fact that the compressing of the dust into an open pipe does not permit a continuous process and, thus, is unsuitable for cleaning the dust filter of a dry sweeping machine, as is described below in more detail with reference to FIG. 1.

Shown in FIG. 1 is a compression tube 8 with a plug 18 (dust in compressed form) and with a compression chamber 12 filled with dust. Assuming a hydrostatic state of stress and a Coulomb state of friction on the tube wall, the mathematical model for the compacted mass being formed results in an exponential increase of pressure in direction toward a piston ram 17 with an exponent of 4 $\mu$l : D, where $\mu$ is the coefficient of friction, 1 the length of the compression tube or the compression chamber, and D the diameter of the compression tube. In a continuous compacting process with an alternating piston ram 17, a new compact is produced in compression chamber 12, the plug 18 is pushed up, and the compact is moved to this position. This means that the plug 18 is brought from the state of static friction to the state of sliding friction. Since the coefficient of static friction is always greater than the coefficient of sliding friction, the compacted mass is further compressed during each stroke of the piston ram due the exponential increase in pressure. After few strokes of piston ram 17, this results in that the plug 18 is no longer pushed out. A conceivable shortening of the length 1 of plug 18 itself would result in that the gas contained in the fluidized bed of dust diffuses into the plug 18, destroys the compressed structure and, thus, allows the compacts to become softer and softer. Thus, the known method as well as the known apparatus are unsuitable for a continuous operation.

BACKGROUND AND SUMMARY OF THE INVENTION

It is therefore the object of the present invention to describe a method and an apparatus for the dustfree discharge of fine dusts from a dust collector of a cleaning vehicle of above-described kind, which permit the fine dusts to be returned into the receptacle for coarse sweepings.

In addition to the above-described characteristics of the known method, the method of the present invention provides that the counteracting force necessary to compact the fine dusts is applied in counterpressure-controlled manner substantially at the discharge end. To this end, the apparatus for carrying out the method in accordance with the present invention is provided with a compression device, which consists of a compression tube with a compression chamber, a blocking chamber, and a controlled shutoff flap closing the compression tube at its discharge end.

In accordance with the invention, the solution to eliminating the deficiencies of the known method and of the known apparatus consists in the cooperation of the tube friction and shutoff flap. In comparison with the compacted mass that forms in the compression chamber, the blocking plug becomes much smaller. The shutoff flap is kept closed for generating the counterpressure, until the desired compaction is reached. Then, the shutoff flap is opened as a result of the pressure, under which the piston ram is operated in the compacting phase, thereby reducing the resistance to ejection and permitting a movement of the compacted mass. The pressure control of the flap by the pressure of the piston ram of the compression device allows the formation of continuously compacted cylindrical chunks in any desired degree of compaction. Thus, the fine dusts are brought, under the action of mechanical compression, from their air-laden, fluidized-bed-type state to a dust-binding state of a solid mass, so as to be discharged as compacted cylindrical chunks or pellets.

More specifically, the advantages of the solution achieved by the present invention consist in that the fine dusts are present in a considerably reduced volume as a result of being compacted in dust-binding form to cylindrical chunks or pellets. From this, two alternate possibilities of further processing the pelletized or cylindrically compacted fine dusts result. First, it is possible to collect same, separately from the coarse sweepings, in their own smaller container. In this kind of further treatment, the solution of the present invention proves to be advantageous, since the consolidated fine dusts are collected at a substantially reduced volume, and that they accumulate only at this reduced volume. This brings enormous savings for communities or the operators of the cleaning vehicles, since a manual removal of dust is problematic. Second, the pelletized or cylindrically compacted fine dusts can again be mixed with the coarse sweepings. Finally, only as a result of the solution of the present invention, is it actually possible to return in a practical and continuous manner the fine dusts to the receptacle for coarse sweepings. In the known methods and apparatus, the aforesaid concentration of the dust circulation leads in many corners and niches to a "growth" of the fine dusts, which is highly undesirable. This concentration is prevented by the pelletized or cylindrically compacted fine dusts, since same are thus present in a bound, solid form. Furthermore, a continuous feed of dust from the dust bunker of the filter into the receptacle for coarse sweepings would be feasible only via bucket-wheel-type gates or other vacuum-resistant conveying devices, which would be accompanied by increased construction cost and expenditure.

For a further development of the compression device it is provided that same includes a piston-cylinder unit, the piston of which extends into a compression tube for displacement in axial direction, that the compression tube can be filled in a retracted position of the piston, and that the fine dusts are compacted by the forward movement of the piston in the blocking chamber under a simultaneous counterpressure exerted by the controlled shutoff flap. The result of the compression changes exponentially to the length of the compression tube and to the static friction, and inversely proportionally to the diameter of the pellets or the compacted cylindrical chunks. However, it may also be changed constantly, i.e., in a constantly reproducible manner, by the pressure-controlled flap of the present invention. A well-adapted correlation of compression chamber volume, blocking chamber volume, and a defined clearance of the piston allows to return the gas expelled from the fine dust into the chamber of the gate, and to thus prevent the dust from forming a bridge in the gate. Via a control element, the pressure in the cylinder-piston unit controls the shutoff flap such that the pellets having an adequate strength as a function of the fine dust consistency ensure a dustfree discharge.

BRIEF DESCRIPTION OF THE DRAWINGS

In the following, a preferred embodiment of the invention is described in more detail with reference to the drawing, in which FIG. 1 is a diagrammatic, lengthwise sectional view of a compression tube with a dust-filled compression chamber 12 and a blocking plug 18;

FIG. 2 is a diagrammatic, lengthwise sectional view of a dust collector with the fine dust compression device of the present invention;

FIG. 3b is a top plan view of the compression device of FIG. 3a; and

DETAILED DESCRIPTION OF PREFERRED EMBODIMENTS OF THE INVENTION

Figure 3A:
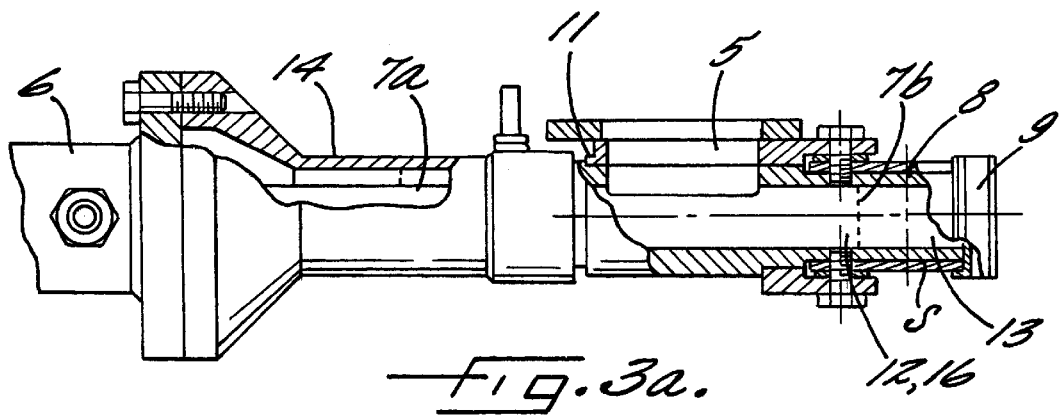
FIG. 3a is a side view, in part axially cut, of the compression device with a compacting unit, gate, and a shutoff flap.

Shown in FIG. 1 is a compression tube with a compression chamber 12 and a blocking plug 18. To produce a compacted mass in compression chamber 12, or for purposes of ejecting plug 18, it is necessary that plug 18 leave in a controlled manner its position within compression tube 8 through an outlet opening, so as to make room for a compact 16 being formed. To this end, a piston ram 17 applies a pressure $P_s$, while a counterpressure $P_o$ is generated by the tube friction, but essentially by a shutoff flap 9 (FIGS. 2–4).

Shown in FIG. 2 is a diagrammatic, lengthwise sectional view of a dust collector 1, which comprises in known manner a group of filter elements 2 for collecting the dust. These filter elements are freed, for example, by shaking the filter elements or, however, by applying thereto from time to time a blast of compressed air, from the fine dusts, which then drop onto a conveyor device 3. In the present embodiment, the conveyor device 3 comprises two oppositely rotating screw conveyors, which are rotated by a drive mechanism indicated at 4. The screw conveyors transport the accumulated fine dusts to the center of the dust collector, where they drop through a feed gate 5 into a tube 8 of a compression device 10. The compression device 10 consists essentially of a piston-cylinder unit 6, 7, compression tube 8 that is flanged thereto, and pressure-controlled shutoff flap 9.

In the retracted position of piston 7 of the cylinder-piston unit, the portion of compression tube 8 located below feed gate 5 is filled with fine dusts by means of the screw conveyors. Subsequently, piston 7 moves forward in the axial direction of compression tube 8, approximately to its position illustrated at 7', thereby compacting the fine dusts in tube 8. The forward and return movements of the piston may occur in a continuous or discontinuous operation as a function of the filling level. The counteracting force necessary for the compacting is generated by the static friction of the compacted fine dusts against the inside wall surfaces of compression tube 8 and shutoff flap 9. The pellets are transported either into a separate container or into the receptacle for coarse sweepings. Subsequent to its compression stroke, the piston rod 7 retracts, and opens the interior of the tube below feed gate 5 for a renewed filling.

Figure 4:
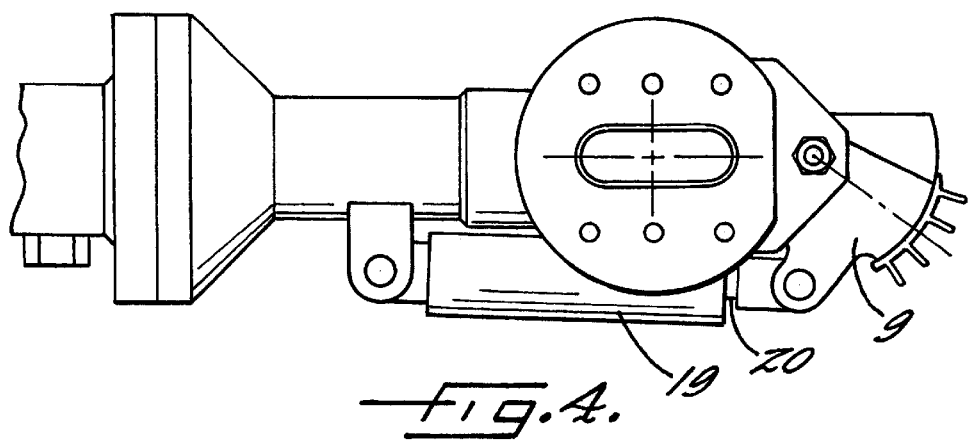
FIG. 4 is a view corresponding to the illustration of FIG. 3b with an opened shutoff flap.

Shown in FIG. 3a is a side view, partially cut, of the compression device 10. From this detailed illustration, it can be noted that gate 5 is connected with compression tube 8, via a compacting unit 11, which includes, subjacent gate 5, a compression chamber 12, as well as a blocking chamber 13 adjoining same in the direction of compressing and, naturally, corresponding sealing and guide elements for a compressing piston 7. As best seen in this illustration, the piston 7 of FIG. 2 is preferably a piston rod, with a first position 7a and a second compression position 7b, attached thereto. To accommodate the first position 7a, an intermediate tube 14 is provided between compacting unit 11 and cylinder 6 of the piston-cylinder unit. The compression chamber 12 forms an all around enclosed chamber, the front ends of which are closed during the compression, on the one hand, by the compression piston and, on the other hand, by the compacted mass located in compression tube 8 and by shutoff flap 9. Since the air confined between the dust particles must escape during the compacting, a defined clearance indicated at "S" is provided between the outer periphery of the compression piston and the inside wall surface of the blocking chamber 13.

Figure 3B:
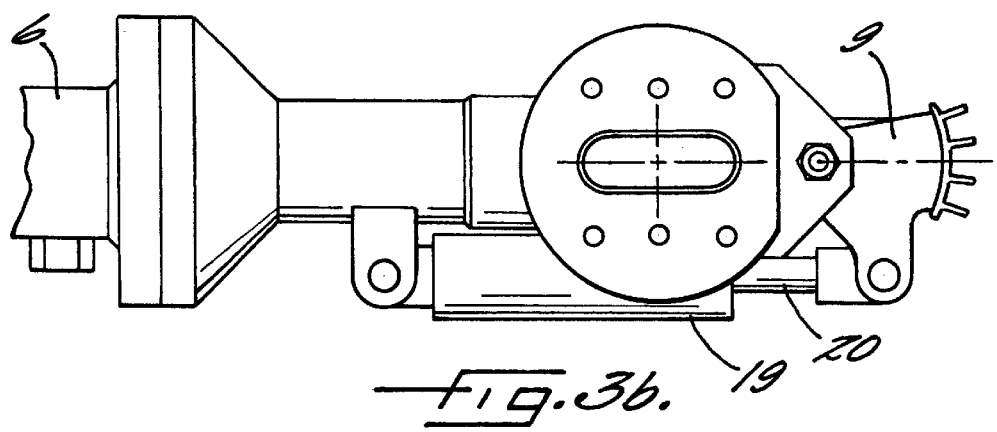

FIG. 3b shows a top plan view of the compression device of FIG. 3a. As a function of the compacting results being achieved, the shutoff flap 9 is kept opened or closed by a further piston-cylinder unit 19, 20 with the aid of an interposed control unit (not shown) that is responsive to the pressure of piston ram 17 FIG. 1. of the piston/cylinder unit.

FIG. 4 shows the opened position of shutoff flap 9.

What is claimed is:

1. A cleaning vehicle having a dry sweeping machine for the collection of fine dust and forming the same into compacted pellets, said dry sweeping machine comprising a horizontally disposed tubular compression chamber having a discharge end, an opposite end, and an ingress opening intermediate said ends, a dust collector including at least one filter for collecting dust and delivering the collected dust into the ingress opening of the compression chamber, a shutoff flap pivotally mounted with respect to said compression chamber so as to be moveable between a closed position closing the discharge end of the compression chamber and an open position wherein said discharge end is open, a piston slideably mounted within said compression chamber for reciprocating movement between a retracted position located on the side of the ingress opening opposite the discharge end of the compression chamber and an extended position located on the opposite side of the ingress opening and adjacent the discharge end, and such that the dust received in the ingress opening is compacted against said shutoff flap upon movement of the piston from the retracted position toward the extended position, and a control for pivoting said shutoff flap from said closed position to said open position upon a controlled counterpressure being exerted upon said piston by the compacted dust, so as to eject compacted pellets from the discharge end of the compression chamber which have a desired degree of compaction.

2. Apparatus according to claim 1 wherein said tubular compression chamber defines a longitudinal central axis wherein said shutoff flap is pivotally mounted to said compression chamber for movement about a pivot axis which perpendicularly intersects said central axis.

* * * * *